United States Patent
Pinsky et al.

(10) Patent No.: US 9,666,187 B1
(45) Date of Patent: May 30, 2017

(54) MODEL FOR ENABLING SERVICE PROVIDERS TO ADDRESS VOICE-ACTIVATED COMMANDS

(71) Applicant: Google Inc., Mountain View, CA (US)

(72) Inventors: Yury Pinsky, Mountain View, CA (US); Steven John Lee, Mountain View, CA (US); Mat Balez, Mountain View, CA (US); Michael J LeBeau, Mountain View, CA (US)

(73) Assignee: Google Inc., Mountain View, CA (US)

( * ) Notice: Subject to any disclaimer, the term of this patent is extended or adjusted under 35 U.S.C. 154(b) by 558 days.

(21) Appl. No.: 13/950,503

(22) Filed: Jul. 25, 2013

(51) Int. Cl.
  *G10L 15/26* (2006.01)
  *G10L 15/22* (2006.01)
(52) U.S. Cl.
  CPC .............. *G10L 15/22* (2013.01); *G10L 15/26* (2013.01)
(58) Field of Classification Search
  CPC ............................... G10L 15/26; G10L 15/265
  See application file for complete search history.

(56) References Cited

U.S. PATENT DOCUMENTS

| | | | |
|---|---|---|---|
| 7,024,205 B1* | 4/2006 | Hose ................. | H04M 3/42357 455/456.1 |
| 2002/0010608 A1* | 1/2002 | Faber ................ | G06Q 10/0631 705/26.1 |
| 2002/0010648 A1* | 1/2002 | Park ................. | G06Q 30/02 705/26.1 |
| 2002/0038233 A1* | 3/2002 | Shubov .............. | G06Q 30/0611 705/26.4 |
| 2002/0161587 A1* | 10/2002 | Pitts, III ............. | G06F 17/3043 704/276 |
| 2003/0060211 A1* | 3/2003 | Chern ................ | H04M 1/6075 455/456.2 |
| 2003/0065805 A1* | 4/2003 | Barnes, Jr. ........... | G06Q 10/02 709/231 |
| 2005/0165663 A1* | 7/2005 | Razumov .............. | G06Q 20/20 705/26.44 |
| 2007/0061336 A1* | 3/2007 | Ramer ............. | G06F 17/30749 |
| 2007/0174258 A1* | 7/2007 | Jones ..................... | G06Q 30/02 |
| 2008/0095331 A1* | 4/2008 | Wlasiuk .............. | H04M 3/4938 379/88.14 |
| 2008/0154611 A1* | 6/2008 | Evermann ......... | G06F 17/30899 704/275 |
| 2008/0194260 A1* | 8/2008 | Altberg .................. | G06Q 30/02 455/435.1 |

(Continued)

FOREIGN PATENT DOCUMENTS

| | | |
|---|---|---|
| EP | 1982280 | 10/2008 |
| EP | 2130359 | 12/2009 |
| WO | 2012082473 | 6/2012 |

*Primary Examiner* — Samuel G Neway
(74) *Attorney, Agent, or Firm* — McDonnell Boehnen Hulbert & Berghoff LLP

(57) ABSTRACT

Methods and systems are described herein related to enabling service providers to address voice-activated commands. An example method may involve: receiving a first utterance on a computing device, where the first utterance includes a first command; selecting a service action corresponding to the first command; determining a selected service provider for the selected service action, where the selected service provider is selected from a plurality of service providers; and sending a service fulfillment request to the selected service provider to execute the selected service action.

20 Claims, 17 Drawing Sheets

(56) References Cited

U.S. PATENT DOCUMENTS

| | | | | |
|---|---|---|---|---|
| 2012/0150636 A1* | 6/2012 | Freeman | ............ | G06Q 30/0241 |
| | | | | 705/14.49 |
| 2012/0158502 A1* | 6/2012 | Chung | ............... | G06Q 30/0269 |
| | | | | 705/14.53 |
| 2012/0249741 A1* | 10/2012 | Maciocci | ................ | G06F 3/011 |
| | | | | 348/46 |
| 2014/0012574 A1* | 1/2014 | Pasupalak | ......... | G06F 17/30554 |
| | | | | 704/235 |

* cited by examiner

----"Order a pizza" 1110
----"Call a plumber" 1120
----"Buy a movie ticket" 1130

MODEL FOR ENABLING SERVICE PROVIDERS TO ADDRESS VOICE-ACTIVATED COMMANDS

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

Methods and systems are described herein related to enabling service providers to address voice-activated commands. An utterance may be received on a computing device, which may include a command. A service action associated with the command may then be selected. A selected service provider may then be determined for the selected service action, where the selected service provider is selected from a plurality of service providers. A service fulfillment request may then be sent to the selected service provider to execute the selected service action.

In one aspect, a method is provided. The method may include: receiving a first utterance on a computing device, where the first utterance includes a first command; selecting a service action that corresponds to the first command; determining a selected service provider for the selected service action, where the selected service provider is selected from a plurality of service providers; and sending a service fulfillment request to the selected service provider to execute the selected service action.

In another aspect, a method is provided that may include: receiving a first utterance on a computing device, where the first utterance includes a first command; selecting a service action that corresponds to the first command; determining one or more selected service providers for the selected service action, where the one or more selected service providers are selected from a plurality of service providers; and displaying on the computing device one or more advertisements corresponding to the selected service action from the one or more selected service providers.

In yet another aspect, a non-transitory computer-readable medium is provided. The non-transitory computer readable medium is configured to store program instructions that, when executed by a processor, cause the processor to carry out functions comprising: receiving a first utterance on a computing device, where the first utterance includes a first command; selecting a service action that corresponds to the first command; determining a selected service provider for the selected service action, where the selected service provider is selected from a plurality of service providers; and sending a service fulfillment request to the selected service provider to execute the selected service action.

Further example embodiments may include: means for receiving a first utterance on a computing device, where the first utterance includes a first command; means for selecting a service action that corresponds to the first command; means for determining a selected service provider for the selected service action, where the selected service provider is selected from a plurality of service providers; and means for sending a service fulfillment request to the selected service provider to execute the selected service action.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1A:
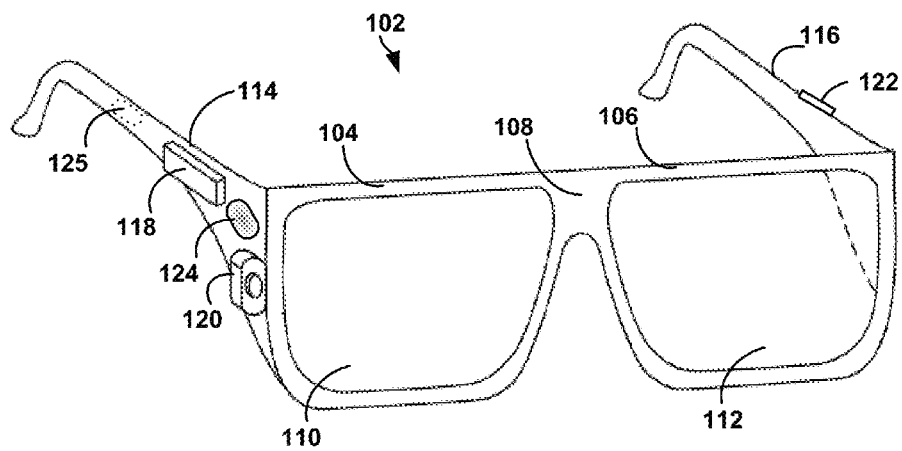
FIG. 1A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

A. Overview

Head-mounted displays ("HMDs") and other computing devices may use a voice-based user interface to capture audible input from the user of the HMD. Upon receiving audible input, the HMD may attempt to recognize the input as a speech command and process the command accordingly. The speech input can represent commands to the HMD, such as commands to search, navigate, take photos, record videos, etc. Some commands may require fulfillment by a third party service provider, such as "order a pizza," "call a plumber," or "buy a movie ticket."

Example systems may allow multiple service providers to address a given voice command. In some examples, a voice command may first be mapped to a selected service action. Then, a third party service provider may be selected from a number of different service providers in order to fulfill the requested service action. For example, if the user commands the device to "order a dozen roses," a service provider may be automatically selected, and the order may be filled. In some examples, the process may be streamlined so that the user may not see which service provider is filling the order.

In further examples, the selected service provider that will fulfill the service request may be chosen based at least in part on an auction. Multiple third party service providers may be given the opportunity to bid on the right to fulfill the service. The highest bidding third party service provider may be selected to fulfill the service request. Further, such an auction could take place prior to the service request or could take place in real time based on bidding criteria provided by the service providers.

Other factors may also be used to determine the selected service provider as well. For example, the HMD user or a system manager may be able to specify that certain service providers are preferred. Additionally, the distance between the computing device and various service providers may be computed, and preference may be given to a closer third party service provider.

In other examples, third party service providers may be able to buy the right to present advertisements related to specific voice commands. For example, if the user commands the device to "order a dozen roses," the user may then be presented with advertisements to buy roses from several different sellers. A service request to provide the dozen roses may then be sent to the service provider whose advertisement is chosen by the user. In one example, the third party service providers that get to display their advertisements may be based at least in part on an auction in which the providers bid on the right to have their ad displayed. Other criteria such as user preference or location may be factored in as well.

In some examples, the space of possible voice commands may be predetermined. The set of commands may be all of the commands accessible to the user by a voice-navigable user interface (VNUI). In additional examples, certain commands may be included within menus reachable by the VNUI by default and other commands may later be added to one of the menus by the user. By selecting commands from a predetermined set of possible commands, HMD users may be able to direct their specific intent to third party service providers without any ambiguity. Further, the third party service providers may only provide bids on the possible voice commands that are relevant to them within the predetermined universe.

In one implementation, the selected service provider(s) for a certain voice command may be predetermined. For instance, if an auction is used to determine the selected service provider(s), the results of the auction may be precomputed. In some examples, the HMD may recognize the voice command immediately without access to the network. The selected service provider(s) may then be pre-computed and pre-cached so that a third party service request may immediately be sent or the ads of selected service provider(s) may be immediately displayed to the user without network access. Further, the selected service provider(s) for a given command may later be refreshed after the command has issued.

In an alternative example, the selected service provider(s) may be determined in real time after the voice command has been received. For example, if an auction will be used to determine the selected service provider(s), the third party service providers may be able to specify certain parameters beforehand that will be used to determine the winners of the auction. These parameters may include the provider's total budget for advertising, the bid price, and a timeout period, for example. In further examples, the parameters may also be made to depend on other factors, such as the location of the HMD user or the time of day.

In an additional example, the HMD user may be able to preconfigure which third party service provider will handle a given command. When the user first executes a command or when the user adds the command to a menu within the VNUI, the user may be presented with a list of service providers. These service providers may be determined based on the results of an auction, based on preferences assigned by a system manager, and/or based on location, for example. The user may then choose a service provider from the list. Whenever the user issues the same voice command in the future, the same service provider may automatically be contacted. Accordingly, the user experience may be improved by not requiring the user to select a service provider multiple times for the same type of service request.

B. Example Wearable Computing Devices

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
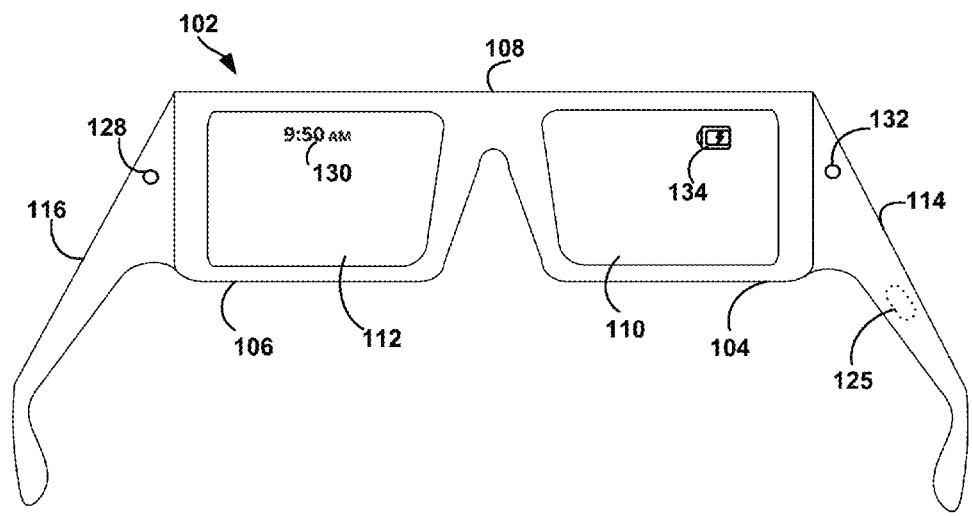
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
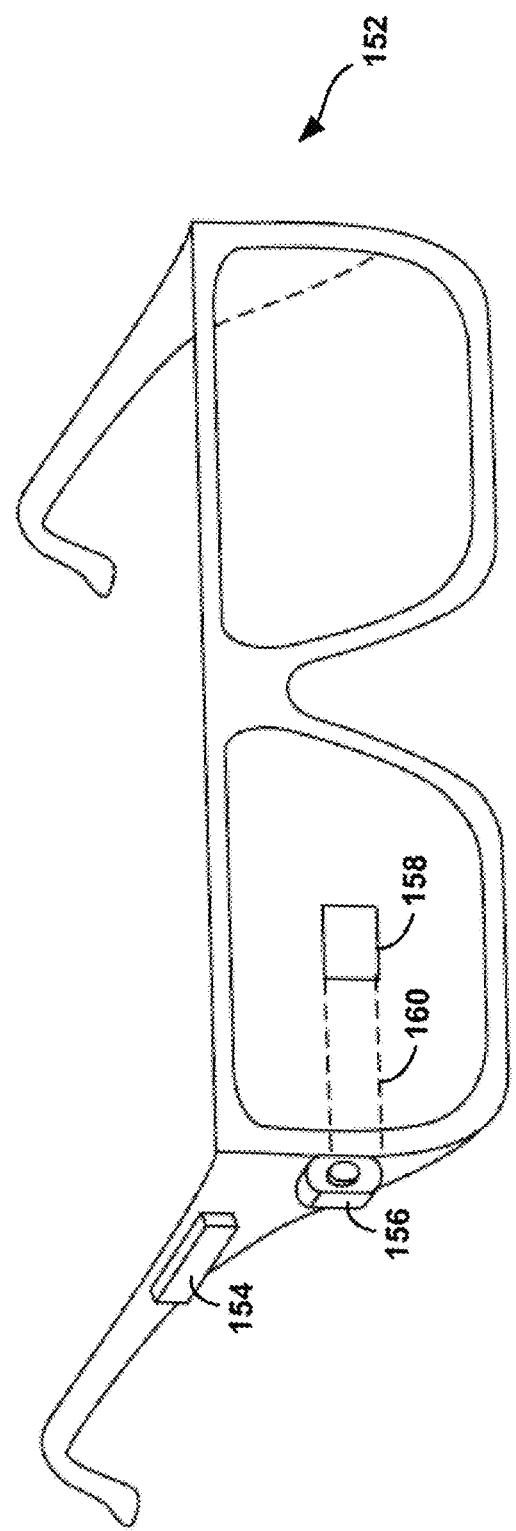
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
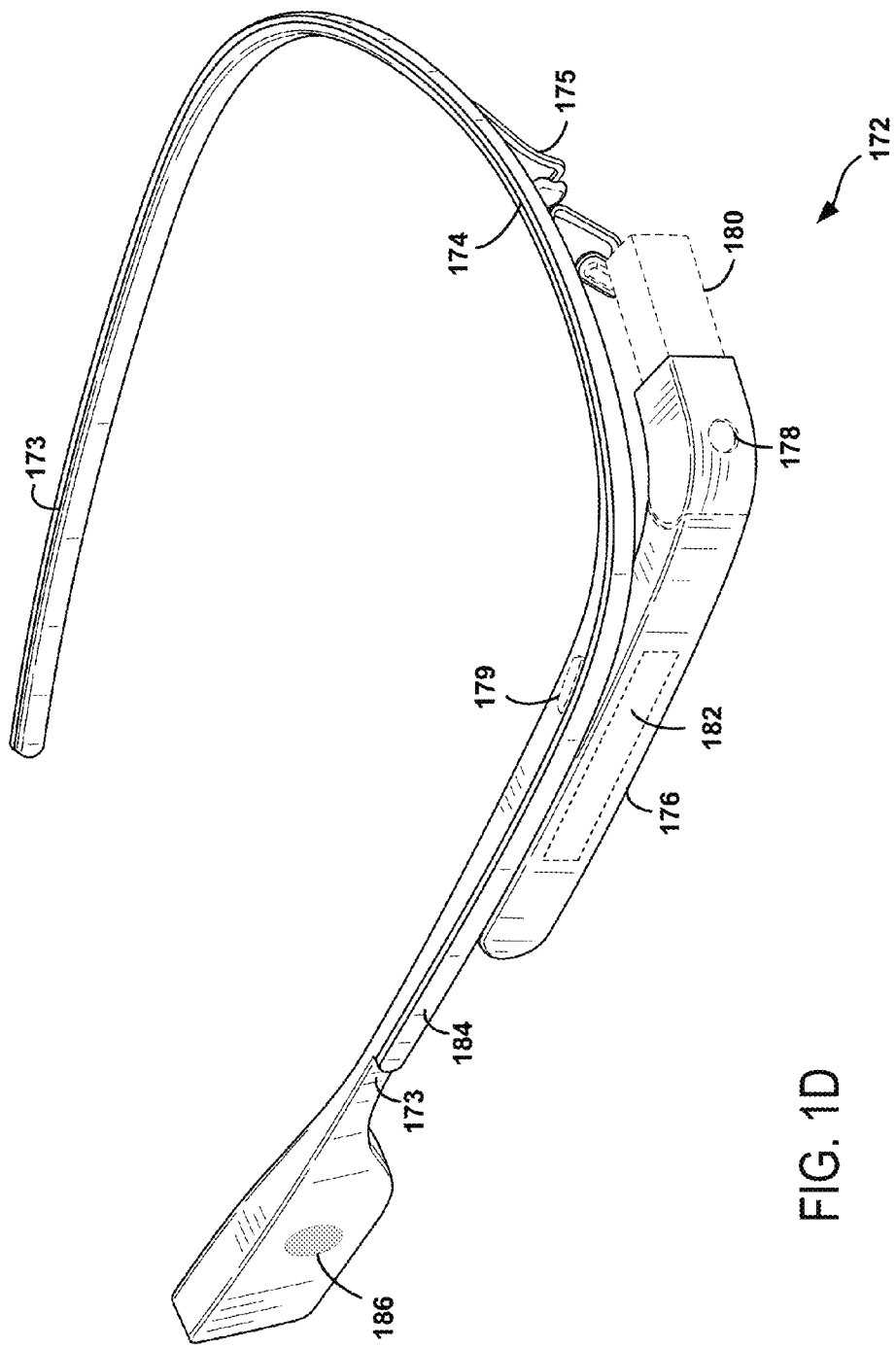
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
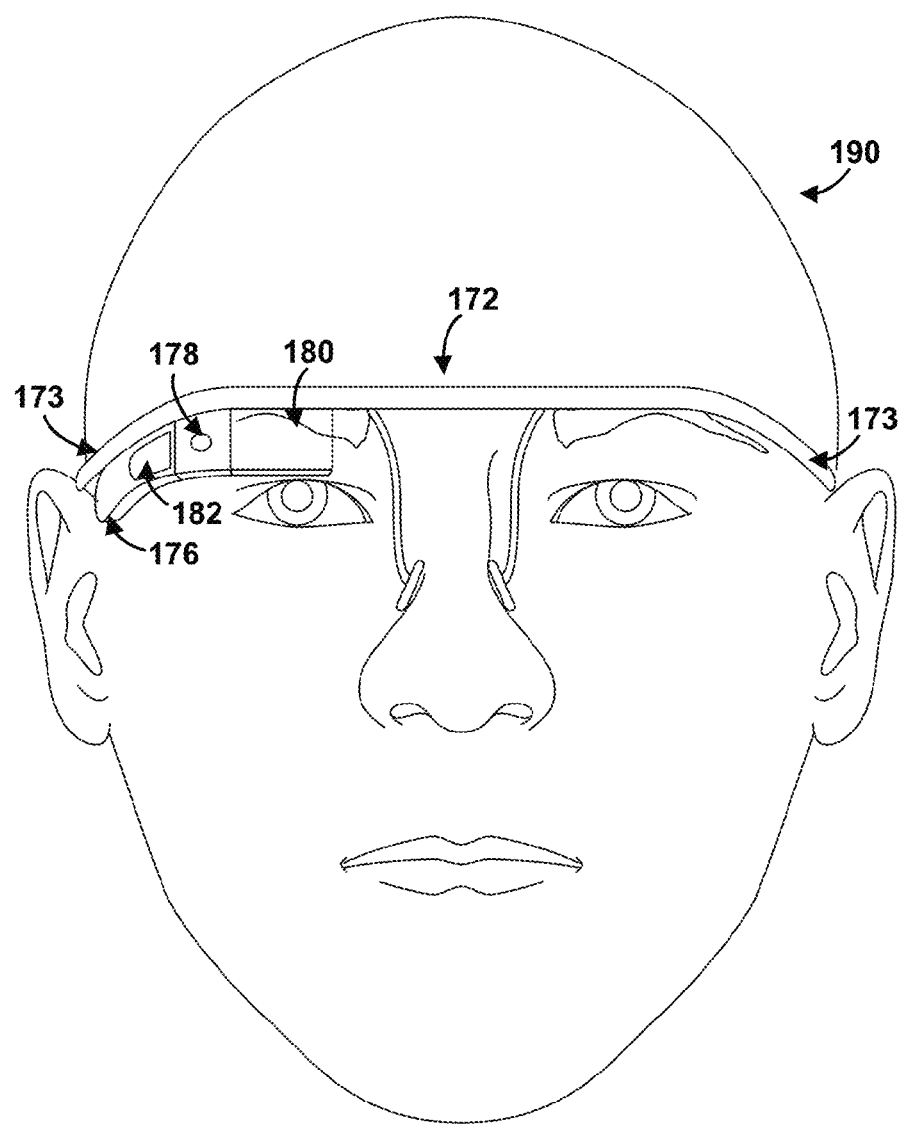
FIGS. 1E to 1G are simplified illustrations of the wearable computing system shown in FIG. 1D, being worn by a wearer.
Figure 1F:
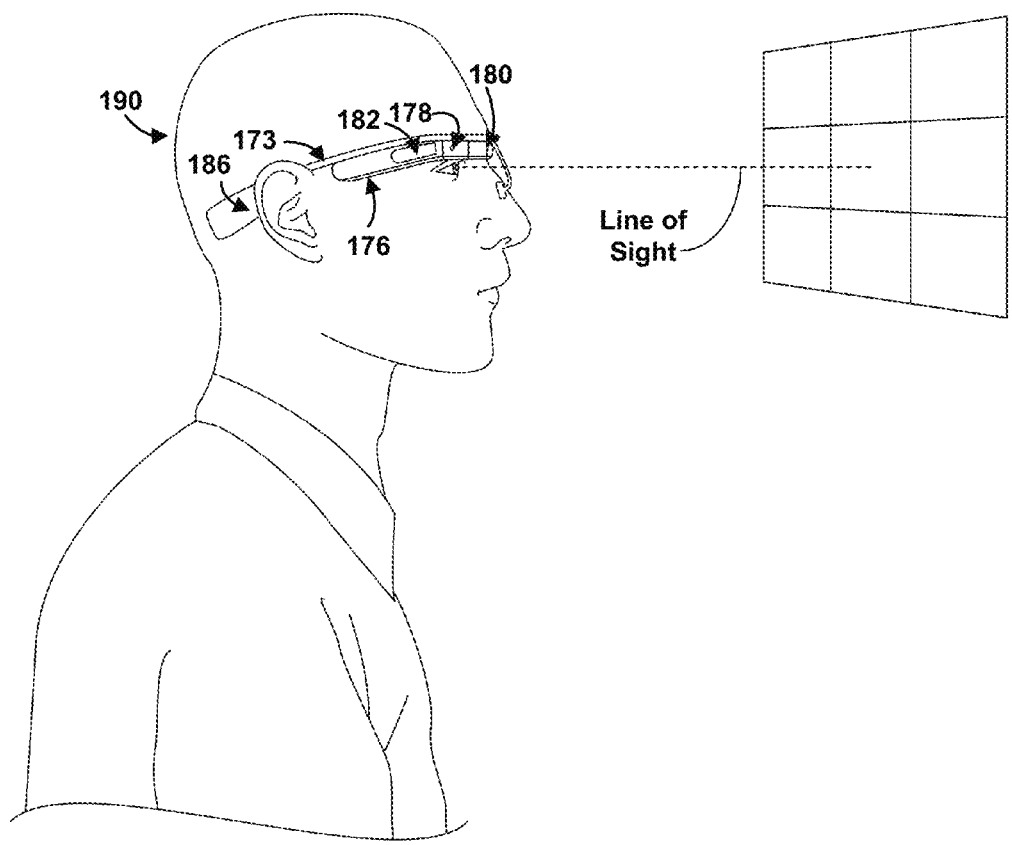
Figure 1G:
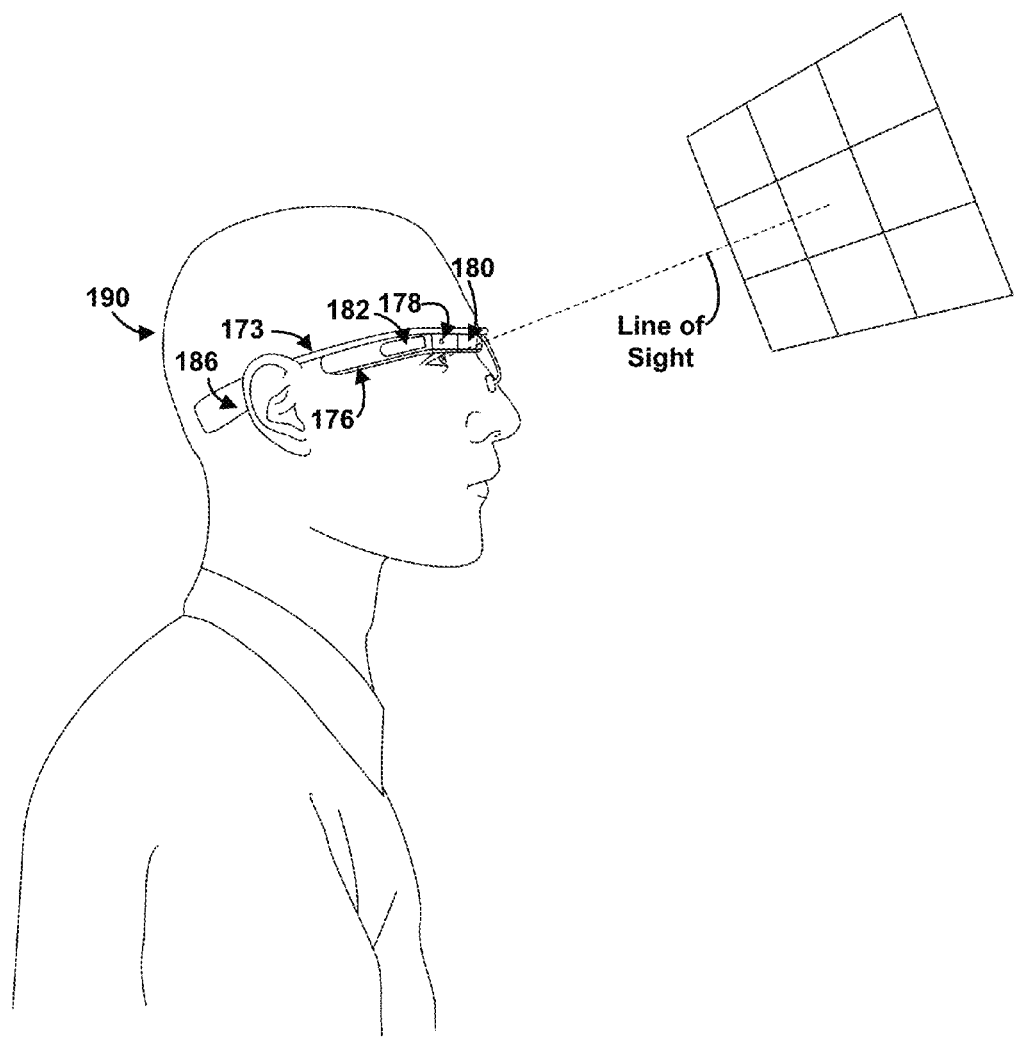

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2A:
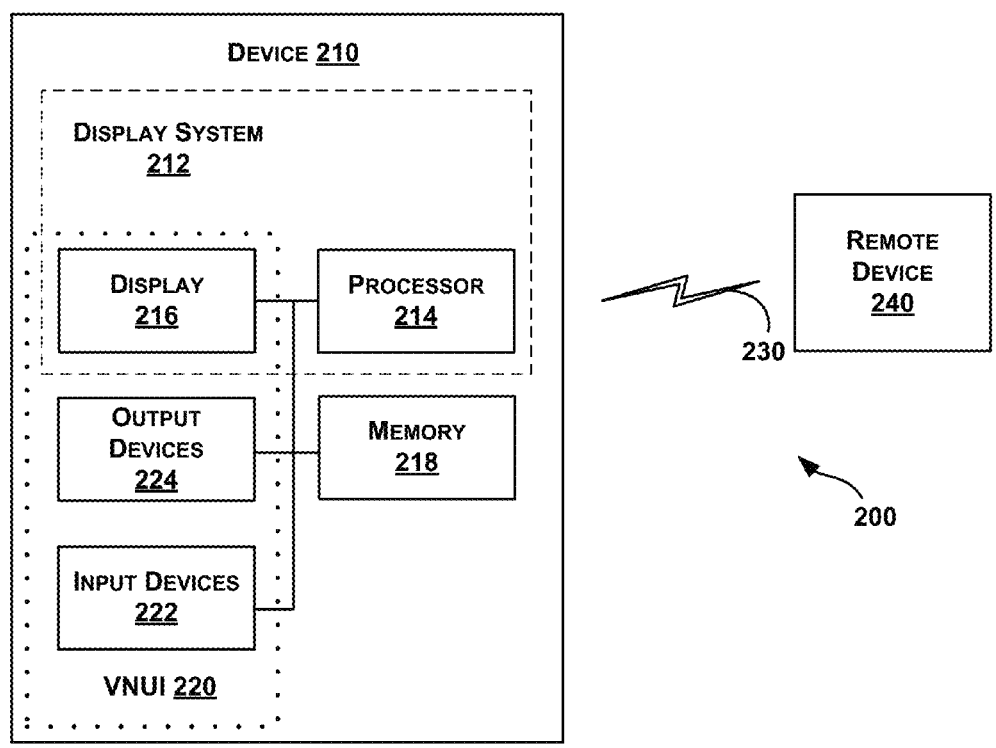
FIG. 2A is a simplified block diagram of a computing device according to an example embodiment.

FIG. 2A is a simplified block diagram of a computing device 210 according to an example embodiment. In an example embodiment, device 210 communicates using a communication link 230 (e.g., a wired or wireless connection) to a remote device 240. The device 210 may be any type of device that can receive data and display information corresponding to or associated with the data. For example, the device 210 may be a heads-up display system, such as the head-mounted devices (HMDs) 102, 152, 172, or 252 described with reference to FIGS. 1A-1G and 2B.

Thus, the device 210 may include a display system 212 comprising a processor 214 and a display 216. The display 210 may be, for example, an optical see-through display, an optical see-around display, or a video see-through display. The processor 214 may receive data from the remote device 240, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 240 may be any type of computing device or transmitter including a laptop computer, a mobile telephone, or tablet computing device, etc., that is configured to transmit data to the device 210. The remote device 240 and the device 210 may contain hardware to enable the communication link 230, such as processors, transmitters, receivers, antennas, etc.

Further, remote device 240 may take the form of or be implemented in a computing system that is in communication with and configured to perform functions on behalf of client device, such as computing device 210. Such a remote device 240 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2A, the communication link 230 is illustrated as a wireless connection; however, wired connections may also be used. For example, the communication link 230 may be a wired serial bus such as a universal serial bus or a parallel bus. A wired connection may be a proprietary connection as well. The communication link 230 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 240 may be accessible via the Internet and may include a computing cluster associated with a particular web service (e.g., social-networking, photo sharing, address book, etc.).

C. Example Image Projection

Figure 2B:
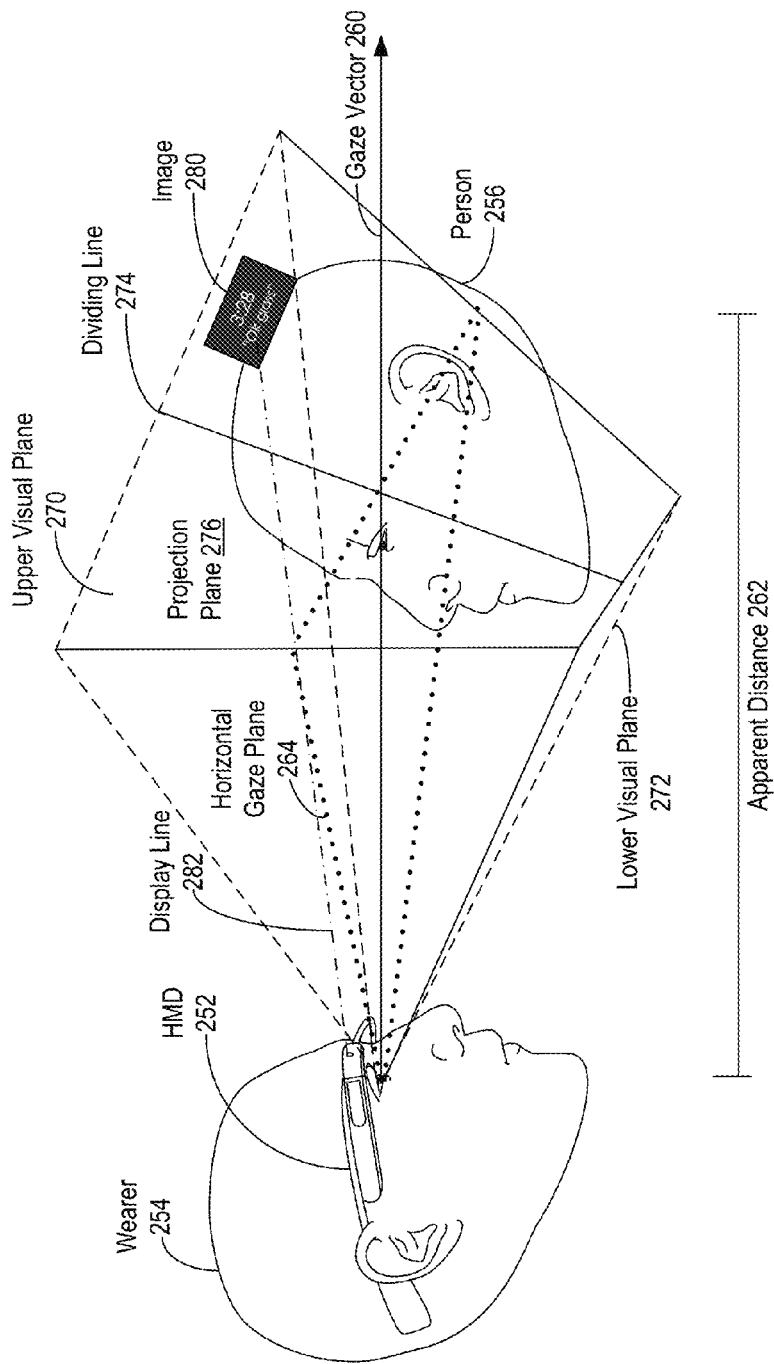
FIG. 2B shows a projection of an image by a head-mountable device, according to an example embodiment.

FIG. 2B shows an example projection of UI elements described herein via an image 280 by an example head-mountable device (HMD) 252, according to an example embodiment. Other configurations of an HMD may be also be used to present the UI described herein via image 280. FIG. 2B shows wearer 254 of HMD 252 looking at an eye of person 256. As such, wearer 254's gaze, or direction of viewing, is along gaze vector 260. A horizontal plane, such as horizontal gaze plane 264 can then be used to divide space into three portions: space above horizontal gaze plane 264, space in horizontal gaze plane 264, and space below horizontal gaze plane 264. In the context of projection plane 276, horizontal gaze plane 260 appears as a line that divides projection plane into a subplane above the line of horizontal gaze plane 260, a subplane a subspace below the line of horizontal gaze plane 260, and the line where horizontal gaze plane 260 intersects projection plane 276. In FIG. 2B, horizontal gaze plane 264 is shown using dotted lines.

Additionally, a dividing plane, indicated using dividing line 274 can be drawn to separate space into three other portions: space to the left of the dividing plane, space on the dividing plane, and space to right of the dividing plane. In the context of projection plane 276, the dividing plane intersects projection plane 276 at dividing line 274. Thus the dividing plane divides projection plane into: a subplane to the left of dividing line 274, a subplane to the right of dividing line 274, and dividing line 274. In FIG. 2B, dividing line 274 is shown as a solid line.

Humans, such wearer 254, when gazing in a gaze direction, may have limits on what objects can be seen above and below the gaze direction. FIG. 2B shows the upper visual plane 270 as the uppermost plane that wearer 254 can see while gazing along gaze vector 260, and shows lower visual plane 272 as the lowermost plane that wearer 254 can see while gazing along gaze vector 260. In FIG. 2B, upper visual plane 270 and lower visual plane 272 are shown using dashed lines.

The HMD can project an image for view by wearer 254 at some apparent distance 262 along display line 282, which is shown as a dotted and dashed line in FIG. 2B. For example, apparent distance 262 can be 1 meter, four feet, infinity, or some other distance. That is, HMD 252 can generate a display, such as image 280, which appears to be at the apparent distance 262 from the eye of wearer 254 and in projection plane 276. In this example, image 280 is shown between horizontal gaze plane 264 and upper visual plane 270; that is image 280 is projected above gaze vector 260. In this example, image 280 is also projected to the right of dividing line 274. As image 280 is projected above and to the right of gaze vector 260, wearer 254 can look at person 256 without image 280 obscuring their general view. In one example, the display element of the HMD 252 is translucent when not active (i.e. when image 280 is not being displayed), and so the wearer 254 can perceive objects in the real world along the vector of display line 282.

Other example locations for displaying image 280 can be used to permit wearer 254 to look along gaze vector 260 without obscuring the view of objects along the gaze vector. For example, in some embodiments, image 280 can be projected above horizontal gaze plane 264 near and/or just above upper visual plane 270 to keep image 280 from obscuring most of wearer 254's view. Then, when wearer 254 wants to view image 280, wearer 254 can move their eyes such that their gaze is directly toward image 280.

D. An Example User Interface for an HMD

The display 216 of device 210 may be available as part of a user interface for an HMD, such as one of example HMDs 102, 152, 172, and 252, as discussed above in more detail in the context of at least FIG. 2A. The display 216 of device 210 can be used to display portions of a VNUI (voice-navigable user interface) 220, which can include display 216, input device(s) 222, such as microphone(s), to receive speech input, and output device(s) 224 such as the display, speaker(s), and/or BCT(s) for audio and/or video output. In an example operation, a user or wearer of an HMD may utter words or phrases displayed on a voice navigable menu to interact with the VNUI 220.

Figure 3A:
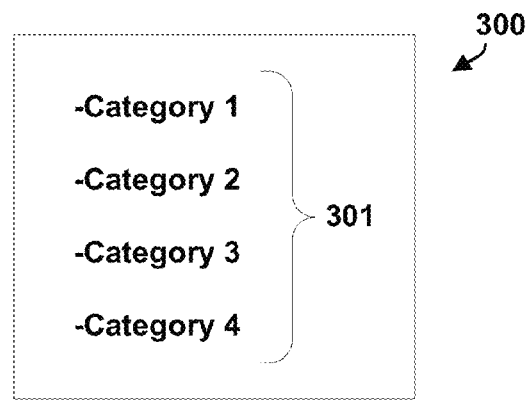
FIG. 3A shows an example voice navigable menu, according to an example embodiment.
Figure 3B:
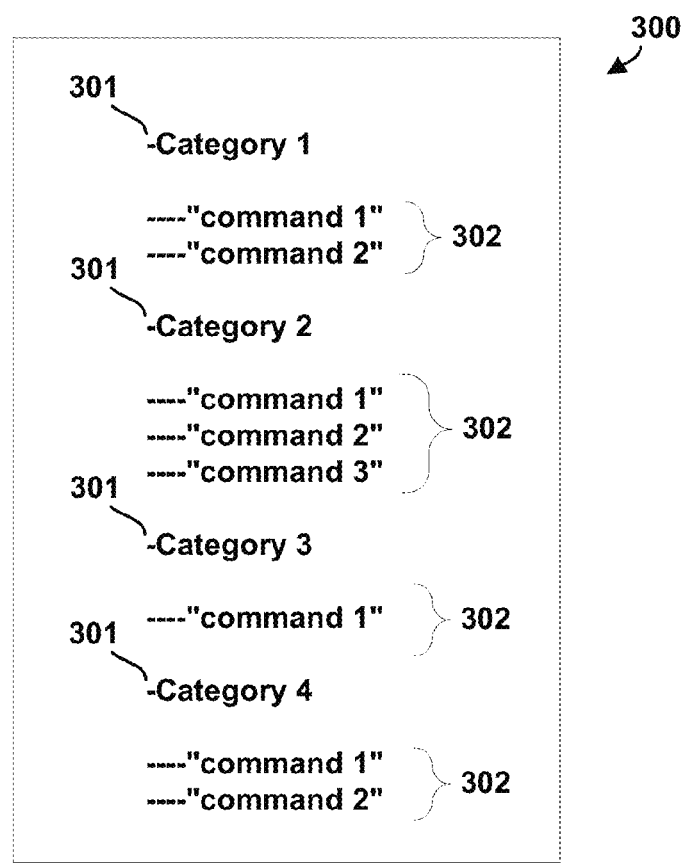
FIG. 3B shows an example voice navigable menu, according to an example embodiment.

FIGS. 3A and 3B show an example voice navigable menu 300, which VNUI 220 can present on the display 216. The voice navigable menu 300 can include one or more categories 301; e.g., "Category 1," "Category 2," "Category 3," and "Category 4" as shown in FIG. 3A. As used herein, a "category," for example, is a menu item that can describe or can be associated with one or more sub-items. For instance, a restaurant menu category "Breakfast" may describe a number of restaurant menu items for breakfast, such as eggs, toast, oatmeal, bacon, etc.

The voice navigable menu 300 can include menu items, such as categories 301 and commands 302 in FIGS. 3A and 3B. The menu items may be organized into "top-level" menu items and "sub-level" menu items. A top-level menu item is, generally, a menu item with which other menu items are associated. In some cases, a top-level menu item is a menu item that can be expanded to reveal lower level menu items, such as sub-level menu items. A sub-level menu item is, generally, a menu item that is associated with another menu item, such as a top-level menu item.

In some cases, the voice navigable menu 300 can have a parent-child hierarchy, in which top-level menu items correspond to a parent menu item and sub-level menu items correspond to a child menu item. In some cases, top-level menu items are displayed on one physical level of the menu, such as a root or base level, while sub-level menu items are displayed on a second physical level of the menu. In some embodiments, the voice navigable menu 300 displays top-level menu items as the left-most items in a display.

In some embodiments, the categories 301 comprise top-level menu items, as shown in FIGS. 3A and 3B. As shown in FIG. 3B, the categories 301—top-level menu items—can be displayed as the left-most (or least-indented) menu items.

Each category can include or be associated with one or more commands 302, and each command 302 can be associated with one or more of the categories 301. In some embodiments, the commands 302 can be sub-level menu items, as shown in FIG. 3B. As shown in FIG. 3B, the commands 302—sub-level menu items—can be displayed further to the right (or further indented) as compared to the top-level menu items.

The categories 301 and commands 302 can be some or all of the menu items in the voice navigable menu 300. For example, other menu items can include identifications of files. Other examples are possible as well.

Some or all of the menu items of the voice navigable menu 300 can be displayed to a wearer on the display 216. In some cases, an HMD may interpret certain head-movements as being wearer input, such as nodding, or looking up, down, left, or right. VNUI 220 may, in turn, interpret such movements as wearer input directing the voice navigable menu 300 to scroll, such that menu items previously not visible on display 216 become visible. In some cases, displayed menu items can also serve as cues to a wearer, by providing the wearer with a word or phrase that the wearer can utter to navigate the menu or invoke a command.

Such utterances by wearer(s) can include the categories 301 and the commands 302. In response to an utterance comprising one of the categories 301, VNUI 220 may display, on the display 216, the command or commands 302 associated with the uttered category. In response to an utterance comprising one of the commands 302, VNUI 220 may invoke the uttered command.

Figure 4:
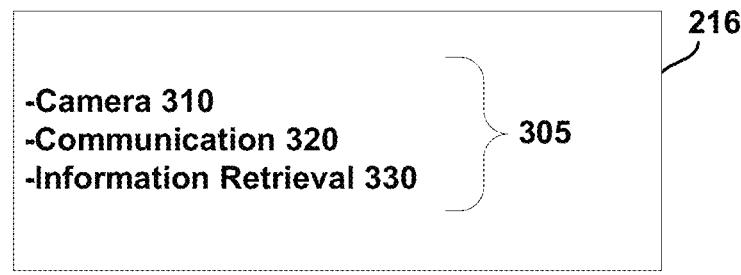
FIG. 4 shows an example visible menu, according to an example embodiment.

FIG. 4 shows an example display 216. The example display 216 can include a visible menu 305. The visible menu 305 can include all or a part of the voice navigable menu 300. For example, in some embodiments, all of voice navigable menu 300 can be visible on the display 216 as visible menu 305. In other embodiments, only a portion of the voice navigable menu 300 may be visible on the display 216 as the visible menu 305. For example, space limitations on the display 216 and/or the length of the voice navigable menu 300 can limit visible menu 305 to displaying only a portion of voice navigable menu 300.

The visible menu 305, like the voice navigable menu 300, can include one or more menu items. In some embodiments, the visible menu 305 can display menu items from the voice navigable menu 300 in a modified or rearranged order. In some embodiments, the visible menu can display sub-level menu items above and/or as top-level menu items.

The visible menu 305 of FIG. 4 depicts, in this example, three example categories displayed as top-level menu items: Camera 310, Communication 320, and Information Retrieval 330. Other categories are possible as well. The visible menu 305 may include other menu items, such as commands, for example.

As discussed, a wearer can interact with the VNUI 220 by uttering a menu item, such as an identification of a category. In an example operation, a wearer may utter a phrase such as "ok glass, open camera" to address the HMD by saying "ok glass" and then requesting the HMD access a camera by saying "open camera."

Figure 5:
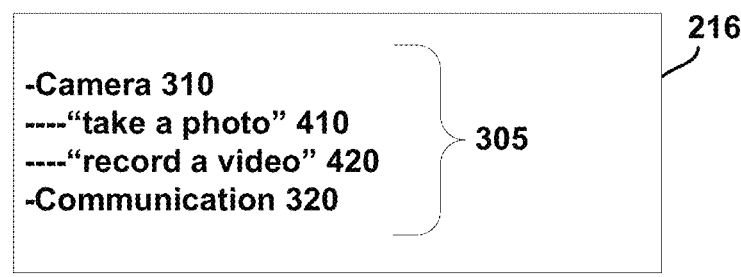
FIG. 5 shows an example visible menu, according to an example embodiment.

In response, VNUI 220 may then display in the visible menu 305 the available commands associated with the uttered category. For example, as shown in FIG. 5, example commands associated with the Camera category 310 may include "take a photo" 410 and "record a video" 420. Other commands are possible as well.

In some embodiments, when a wearer opens a category, VNUI 220 can show the commands associated with the category as sub-level menu items in-line with the top-level menu items, as shown in FIG. 5. In particular, FIG. 5 shows the "take a photo" 410 and "record a video" 420 sub-level commands in-line with the Camera 310 and Communication 320 top-level categories in the visible menu 305.

In this example, the VNUI associates a set of commands with a category by showing the commands below the associated category and slightly indented. Other ways of showing top-level menu items and sub-level menu items, and of differentiating top-level menu items from sub-level menu items, are possible as well. The visible menu 305 also includes another category, Communication 320, which is not associated with the displayed commands and which is displayed below the commands.

Figure 6:
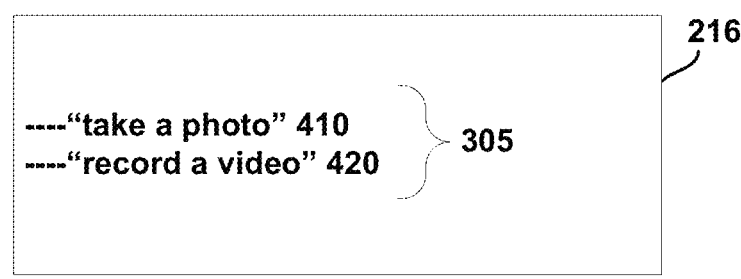
FIG. 6 shows an example visible menu, according to an example embodiment.

In other embodiments, when a wearer opens a category, VNUI 220 can show the commands as a stand-alone sub-menu on the display 216, as shown in FIG. 6. In particular, as seen in FIG. 6, the visible menu 305 includes commands associated with a particular category, but no categories or other menu items.

Minimizing the number of menu items in the visible menu 305 can increase focus on commands likely to be invoked and so allow more efficient invocation of those commands. For example, the two commands "take a photo" 410 and "record a video" 420 presented in the visible menu 305 of FIG. 6 may be the two commands a wearer is most likely to want to invoke (based on, for example, the wearer uttering an identification of the Camera 310 category).

In addition, by minimizing menu items in the visible menu 305, VNUI 220 may make navigating the menu more efficient. For example, a minimal or reduced number of menu items may keep a wearer from reading or mentally processing additional and potentially unneeded menu items.

In any case, VNUI 220 can highlight or more prominently display certain menu items. To do so, VNUI 220 can, for example, display the menu item at the top of the visible menu 305. In other embodiments, VNUI 220 can emphasize the menu item compared to one or more other menu items, without necessarily displaying the menu item at the top of the visible menu 305.

For example, once a wearer has invoked a command, VNUI 220 can "bubble-up" the command to the top of the visible menu 305 or to a position above another command or a category. In particular, the next time a wearer invokes the menu, VNUI 220 can present, for example, a most recently used and/or a most frequently used command above other menu items. In some cases, VNUI 220 can present the command at or near the top of the visible menu 305.

Figure 7:
FIG. 7 shows an example visible menu, according to an example embodiment.

FIG. 7 shows an example menu in which the visible menu 305 includes the command "take a photo" 410 above the categories Camera 310, Communication 320, and Information retrieval 330. In FIG. 7, VNUI 220 has bubbled-up the command "take a photo" 410 to a position above the displayed categories. There may also be other menu items available but not displayed in the visible menu 305.

Figure 8A:
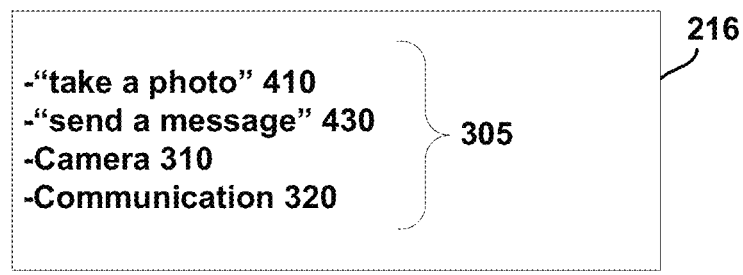
FIG. 8A shows an example visible menu, according to an example embodiment.

FIG. 8A shows an example menu in which the visible menu 305 includes the commands "take a photo" 410 and "send a message" 430 above the categories Camera 310 and Communication 320. Here, VNUI 220 has bubbled-up the commands "take a photo" 410 and "send a message" 430 to a position above the displayed categories. There may also be other menu items available but not displayed in the visible menu 305.

In any case, once a wearer has used VNUI 220 to navigate to and invoke one or more commands, the visible menu 305 can include both available categories and commands. In some embodiments, the visible menu can display both available categories and commands as top-level menu items, as in FIGS. 7 and 8A.

By bubbling up or prominently displaying one or more menu items, VNUI 220 can present the one or more menu items in a manner that attempts to predict a wearer's intent when using the VNUI. In particular, the VNUI can determine a command likely to be used, and the VNUI can display the command to appear more prominently than other menu items.

VNUI 220 can use any number of various criteria to determine which command or commands a wearer is likely to invoke. As one example, the VNUI can determine a command likely to be used based on how frequently commands are used by the wearer. In particular, the VNUI may bubble up the command or commands used most frequently by a wearer, such that a more frequently invoked command appears at the top of the menu.

As another example, the VNUI can determine a command likely to be used based on how recently a wearer has used the command. In particular, the VNUI may bubble up the command or commands used most recently by a wearer, such that a more recently invoked command appears at the top of the menu.

As yet another example, VNUI 220 can bubble up the commands based on some combination of criteria. For instance, the VNUI can bubble up commands based on a first criteria of how recently a wearer has used the command, and then, for those commands with similar frequencies of use, based on a second criteria of how recently a wearer has used the command or commands.

Taking the visible menu 305 of FIG. 6 as one particular example, VNUI 220 may have determined that a wearer is more likely to use the "take a photo" 410 command than other menu items. Accordingly, the VNUI can, in this example, display the "take a photo" 410 command above the other menu items in the visible menu 305.

Taking the visible menu 305 of FIG. 8A as another particular example, VNUI 220 may have determined that a wearer is more likely to use the "take a photo" 410 and "send a message" 430 commands than other menu items (such as other commands). Accordingly, VNUI 220 can, in this example, display the "take a photo" 410 and "send a message" 430 commands above the other menu items in the visible menu 305.

VNUI 220 may also have determined that a wearer is more likely to use the "take a photo" 410 command than the "send a message" 430 command. Accordingly, the VNUI can, in this example, display the command "take a photo" 410 above the command "send a message" 430 in the visible menu 305.

In addition, as one or more commands or menu items bubble up, other commands or menu items can "bubble down." For example, commands that have previously been bubbled up can be displaced by newly bubbled up commands. In some cases, a displaced command can be displayed below a newly bubbled up command. In other cases, the displaced command can be displayed only once a wearer utters the name of a category with which the displaced command is associated. Other examples are possible as well.

By bubbling up commands, the VNUI also encourages a wearer to speak the command directly from the top-level menu. If a wearer sees the command in a visible menu with top-level menu items, the wearer should not need to navigate to a submenu to view commands associated with a category before invoking the command. Accordingly, bubbling up commands may make the VNUI more efficient for a wearer.

As an example, a wearer can directly invoke a command that has been bubbled up to the top-level menu. In particular, FIG. 7 shows the command "take a photo" 410 bubbled up in the visible menu 305. A wearer can directly invoke this command via VNUI 220 by uttering a sequence such as "ok glass, take a photo," instead of having to navigate to the command by uttering the sequence "ok glass, open camera, take a photo."

Regardless of whether a command has been bubbled up or displayed more prominently, wearers of some embodiments can invoke a command directly from the top-level menu—without needing to navigate to a category. Some embodiments of the VNUI can incorporate a "hotword" approach to voice recognition. Each command can be treated as a hotword, and the VNUI can recognize and carry out the command, even if the command is not displayed on the visible menu 305.

As an example, other commands may not be visible in the visible menu 305 of FIG. 8A, although they may be available. In particular, VNUI 220 may include the command "record a video," which VNUI 220 may not display in the visible menu 305. A wearer can also directly invoke this command via VNUI 220 by uttering a sequence such as "ok glass, record a video," instead of having to navigate to the command by uttering a sequence such as "ok glass, open camera, record a video." Accordingly, the system allows a wearer to utter a command directly, without the command being visible on the menu.

The system also allows for a wearer to be able to invoke commands from one category while viewing commands from another category. For example, the visible menus 305 of FIG. 5 and FIG. 6 display commands in the category "Camera" 310. A wearer can also directly invoke, via VNUI 220, a command from another category, such as the command "send a message" 430 from the category Communication 320. In particular, from the visible menus 305 of FIG. 5 or 6, a wearer can utter a sequence such as "ok glass, send a message" to directly invoke the "send a message" command, even if that command is not displayed on the visible menu 305.

In some embodiments, a wearer may also use VNUI 220 to navigate to a category that is not in the visible display. For example, the visible menu 305 of FIG. 5 shows the category Camera 310 and the category Communication 320, but not the category Information Retrieval 330 (as shown in FIG. 4). In this example, from the visible menu 305 of FIG. 5, a wearer can utter a sequence such as "ok glass, open information retrieval" to view available commands in that category.

Associating commands with categories, bubbling up the command(s) most likely to be used, and allowing commands to be invoked from anywhere within the available menu can help the scalability of voice navigable menus. Such a system can allow for more voice commands to be added with minimal impact on the ability of the VNUI and visible display to efficiently guide a wearer through the menu.

The menu items in the visible menu 305 can act as cues for a wearer of the voice navigable menu 300. In other words, the items in the visible menu 305 can tell a wearer what to say to invoke a command or to navigate the menu. For example, by speaking a command, a wearer can invoke the command. And by speaking a category, a wearer can navigate to the available commands in that category.

The ability to efficiently guide a wearer through the voice navigable menu may be an especially important consideration for new or infrequent wearers. Likewise, even experienced wearers may be unfamiliar with available menu items such as commands or categories (such as, for example, if commands or categories are added to the voice navigable menu).

In particular, associating commands with categories can reduce the number of items displayed in, for example, a top-level menu. For instance, multiple commands can be associated with each category, and commands may be added to each category as the system develops. The number of categories will likely be less than the number of commands. A menu that displays some or all available categories may have fewer menu items than a menu that displays, for example, all available commands.

A menu with fewer menu items may be easier to navigate, especially on a smaller display of an HMD. In particular, an HMD may have a smaller display than other mobile computing devices. In some cases, an HMD may have a significantly smaller display than other computing devices. Accordingly, the display 216 and visible menu 305 of an HMD may also be smaller or significantly smaller than other computer devices.

Because of the smaller display 216, fewer menu items may be able to be presented to a wearer on the visible menu 305. Accordingly, the fewer menu items in the voice navigable menu 300, the better chance that the visible menu 305 can include the entire voice navigable menu. Alternatively, if the visible menu 305 only includes a portion of the entire voice navigable menu 300, minimizing the number of menu items in the voice navigable menu 300 should help increase the amount of the voice navigable menu 300 included in the visible menu 305.

A wearer's efficiency in navigating a voice navigable menu should increase with a wearer's ability to see more of the voice navigable menu in the display 216. In other words, the time spent by a wearer navigating the voice navigable menu should be less if the visible menu 305 includes more of the available categories and commands.

Bubbling up the command or commands most likely to be used can also help a wearer efficiently navigate a voice navigable menu. For example, the bubbled up commands may be the commands a wearer is most likely to want to invoke. In such a case, a wearer may be able to more quickly recall or invoke a command if the command is visually presented to the wearer—or visually presented to the wearer in a prominent way, such as at the top of a visible menu.

In particular, a wearer seeking a particular command may avoid having to navigate to that command. Instead, if that command is displayed in the top-level menu (at the top or in some other, prominent way), a wearer can immediately receive the visual cue for the command without having to navigate to the category.

In addition, allowing commands to be invoked from anywhere within the available menu can also reduce the need for a wearer to navigate to a particular category (or top-level visible menu) before invoking the command.

E. Updating the Example User Interface

Some embodiments also allow for the addition of applications or features, in some cases from third-parties. In such embodiments, the added applications can result in added commands. In the voice navigable menu, the added commands can be associated with an added command menu item, which can comprise an added command category in the voice navigable menu.

For discussion purposes, an added command can be distinguished from an original command. An original command can refer to a command that may have been originally provided in or, in some cases, previously added to a voice navigable menu. In addition, an added command menu item can be distinguished from an original menu item. An original menu item can refer to a menu item, such as a category, that may have been originally provided in or, in some cases, previously added to a voice navigable menu.

In some instances, the added applications can be treated collectively as a category in the voice-navigable menu (such as a "Glass Apps" category or an "Added Command" category, for example). In other cases, a third-party application or one or more added commands may be treated as its own category (such as a "Facebook" category, for example).

Figure 8B:
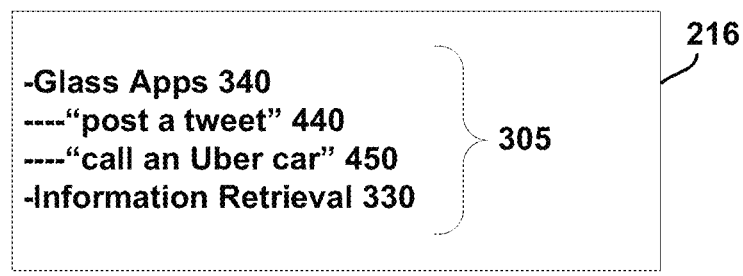
FIG. 8B shows an example visible menu, according to an example embodiment.

Turning to FIG. 8B, as a more particular example, a category for added applications (such as third-party applications) can be Glass Apps 340, and commands within that category may be, for example, (i) "post a tweet" 440 and (ii) "call an Uber car" 450—commands associated with two different third-party features.

As shown in FIG. 8B, in the visible menu 305, uttering "ok glass, open Glass Apps" would show the added commands "post a tweet" 440 and "call an Uber car" 450. Accordingly, added commands can be invoked via VNUI 220 by uttering a sequence such as "ok glass, open Glass Apps, post a tweet."

As with other commands, added commands such as "post a tweet" 440 and "call an Uber car" 450 can be bubbled up in the top-level menu. As also with other commands, added commands can be directly invoked via VNUI 220 by uttering a sequence such as "ok glass, post a tweet," instead of having to navigate to the added command by uttering the sequence "ok glass, open Glass Apps, post a tweet."

In addition, a menu item for an added command can be the command itself, instead of an ambiguous menu item that merely opens an app or leads to further menu items. For example, a menu item such as the command "post a tweet" provides more guidance to a wearer than a menu item such as "open Twitter."

A wearer may choose which additional or third-party applications or features to install or enable in a set-up portal for the HMD device. The set up portal may be part of the HMD or the VNUI 220 itself, or it may be accessed through interfaces of other devices (such as an Internet browser on a computing device). Additional or third-party applications may also be added to the VNUI automatically by a computing device executing suitable software.

If a wearer chooses particular additional or third-party applications or features, there may be a set-up sequence that asks a wearer to specify whether:

I'd like to use Glass to . . .

. . . post a tweet [ON | OFF]

. . . call an Uber car [ON | OFF]

Accordingly, commands can be added to the voice navigable menu 300 based on the features that the wearer enables. Once added to the voice navigable menu 300, the added commands can be displayed in the visible menu 305 and treated similarly to the commands discussed above.

One unique property of this example set-up sequence is that the set-up flow uses the same verb form of a command that a wearer would utter when invoking the command. In particular, uttered commands (e.g., "post a tweet") use the English imperative verb form, while the set-up flow ("I'd like to use Glass to . . . ") uses the English infinitive verb form, and each verb form is orthographically/lexicographically identical in English. In other words, a wearer can use the same verb form of "post a tweet" both during a set-up sequence ("I'd like to use Glass to post a tweet") and when invoking the command ("ok glass, post a tweet").

Figure 9A:
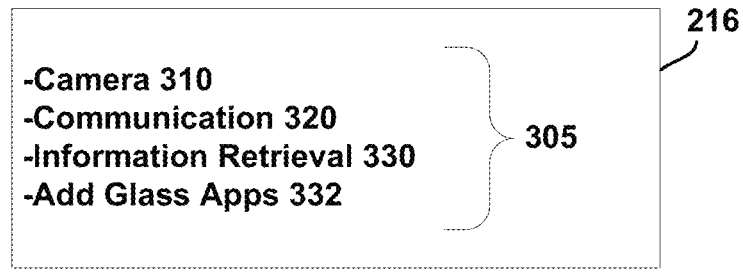
FIG. 9A shows an example visible menu, according to an example embodiment.
Figure 9B:
FIG. 9B shows an example visible menu, according to an example embodiment.
Figure 9C:
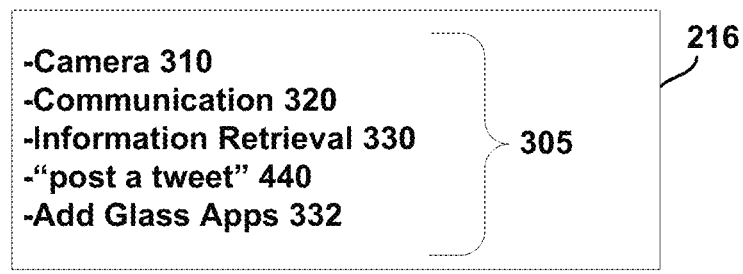
FIG. 9C shows an example visible menu, according to an example embodiment.

In particular, FIGS. 9A-9C depict an example set-up sequence that can be presented on the display 216 of VNUI 220. In this example, FIG. 9A shows a menu item Add Glass Apps 332 in the visible menu 305. To select the Add Glass Apps 332 menu item, a wearer can utter "ok glass, add glass apps."

VNUI 220 may then present to the wearer the visible menu 305 of FIG. 9B, which displays two available commands for selection: enable "post a tweet" 334 and enable "call an Uber car" 336. To enable one of the available commands, a wearer can utter "ok glass, enable 'post a tweet.'"

VNUI 220 may then present to the wearer the visible menu 305 of FIG. 9C, which displays the "post a tweet" 440 command as a menu item. As discussed, the "post a tweet" command may also be added or associated with a category of added commands, such as the Glass Apps 340 category of FIG. 8B.

Added commands (such as third-party or other added commands) may be merged into an existing library of voice commands. Because of the potentially large number of added or third-party commands, potential added commands can be selected and approved to maintain distinctiveness from other commands. One consideration may be selecting potential added commands that are long enough to provide phonetic distinctiveness from other commands (for example, "post a tweet" instead of "tweet").

In addition, a computer executing suitable software can determine a phonetic distance between a potential added command set and existing commands, perhaps in an existing command set. If the smallest phonetic distance between commands in the potential added command set and an existing command set is greater than a threshold, the computer can determine that the potential added command set may be acceptable for addition in the command set. If the smallest phonetic distance is less than the threshold, however, then the computer can determine that the potential added command set may not be distinguishable from the existing command set by the speech recognition system. In some embodiments, the computer can identify command(s) in the potential added command set whose phonetic distance is within the threshold, and suggest those commands be modified or rejected for inclusion of the potential added command set into the existing command set.

The VNUI can be periodically updated with added commands as needed.

F. Example Methods of Operation

As noted above, the user of an HMD or other computing device may be able to give voice commands to the device. These commands may be accessible on voice-navigable menus as part of a VNUI, for example. Certain voice commands may require fulfillment by a third party service provider. For instance, an HMD user may give a command to buy a dozen roses, order a pizza, buy a particular widget, request a plumber, request emergency assistance, and so on.

Figure 10:
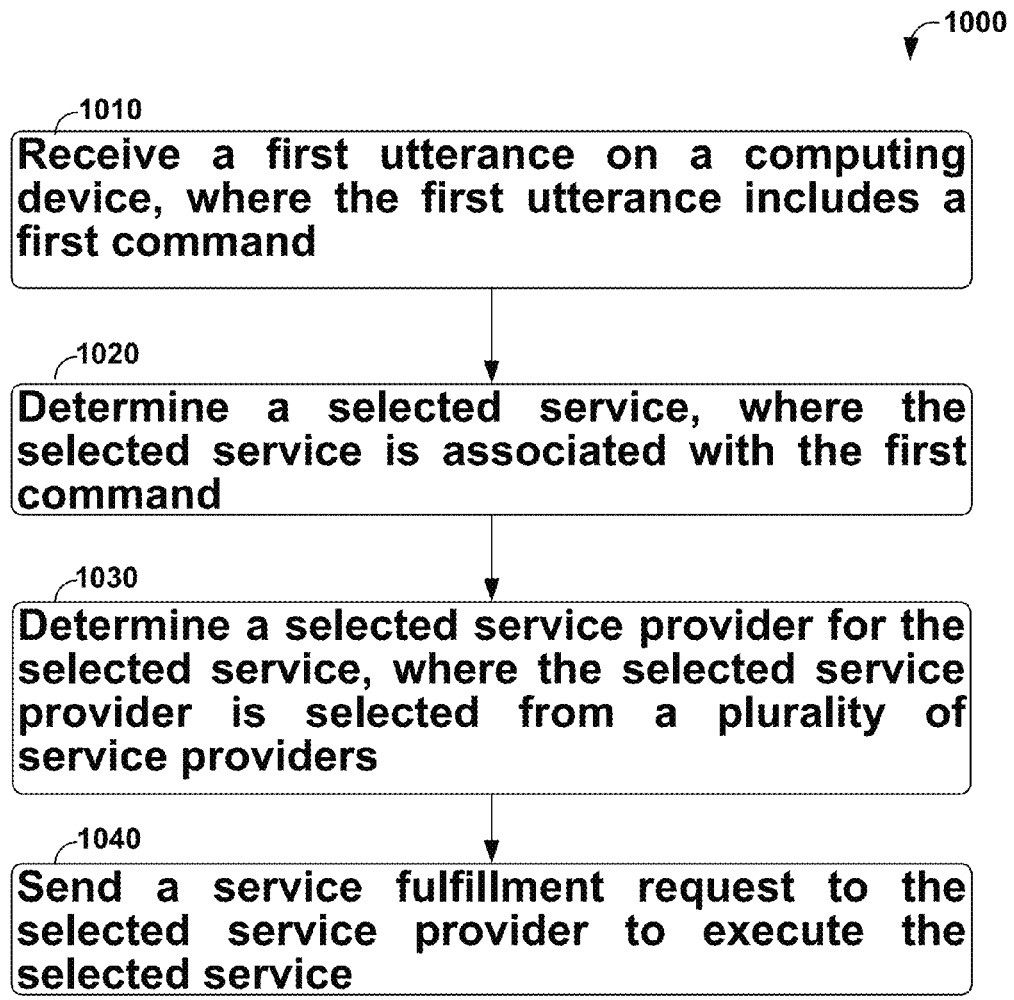
FIG. 10 is a flow chart illustrating a method, according to an example embodiment.

FIG. 10 is a flow chart illustrating a method 1000, according to an example embodiment. In FIG. 10, method 1000 is described by way of example as being carried out by a wearable computer and possibly a wearable computer that includes a head-mounted display (HMD). However, it should be understood that example methods, such as method 1000, may be carried out by a wearable computer without wearing the computer. For example, such methods may be carried out by simply holding the wearable computer using the wearer's hands. Other possibilities may also exist.

Further, example methods, such as method 1000, may be carried out by devices other than a wearable computer, and/or may be carried out by sub-systems in a wearable computer or in other devices. For example, an example method may alternatively be carried out by a device such as a mobile phone or laptop computer. Other examples are also possible.

In some exemplary embodiments, a remote server may help reduce the HMD's processing load. In such embodiments, the HMD may send certain data about a service request to a remote, cloud-based server system, which may perform some or all of the necessary data processing (e.g., determining a selected service provider) in order to reduce the load on the HMD. As part of a cloud-based implementation, the HMD may communicate with the server through a wireless connection, through a wired connection, or through a network of wireless and/or wired connections. In some examples, the server may also communicate with third party service providers through a wired connection, or through a network of wireless and/or wired connections.

As shown in FIG. 10, method 1000 begins at block 1010, where a computing device such as an HMD may receive a first utterance, which includes a first command. For example, an utterance may be one or more words, one or more phrases, a sentence, or a series of sentences spoken by a user of an HMD. As described above, the HMD may process a user's speech and determine that a certain command has been issued by the user. In some examples, the command may be selected by the user from a menu within a VNUI.

Figures 11A, 11B:
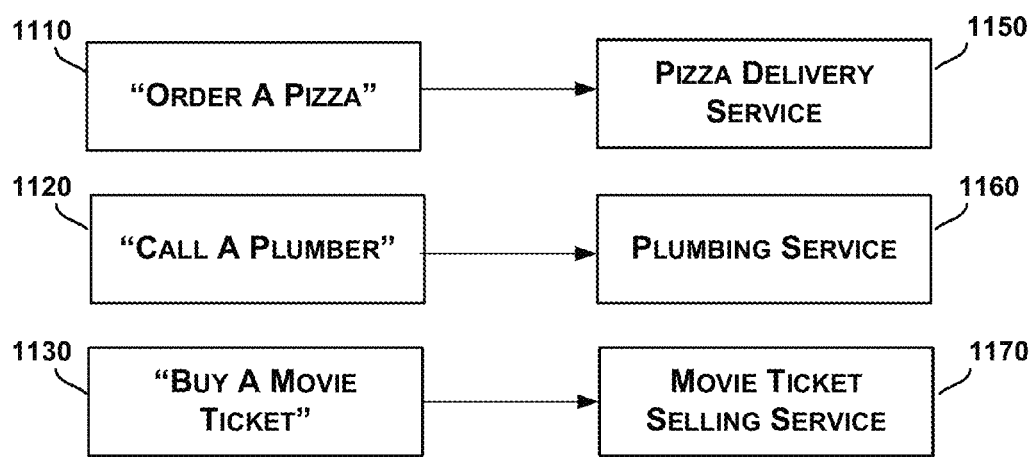
FIG. 11A shows an example list of commands, according to an example embodiment.
FIG. 11B shows an example command-service mapping, according to an example embodiment.

A command could be any number of a wide variety of requests from the user to the device. A certain subset of those commands may require fulfillment by a third party service provider. FIG. 11A shows an example list of commands, according to an example embodiment. Each of the commands may be accessible to the user, for example by including the commands in one or menus of a VNUI. Each command ("order a pizza" 1110, "call a plumber" 1120, "buy a movie ticket" 1130) may require fulfillment by a third party service provider (e.g., a pizza restaurant, a plumber, a movie theater). It should be understood that these commands are meant only as examples. Any command to order a product or request a different type of service from a service provider may be used as well.

In some examples, the space of possible voice commands that require the assistance of a third party may be predetermined. The voice commands that can be recognized at block 1010 of the method 1000 may be taken from a predetermined set of voice commands that may include 500 commands or 5,000 commands or 50,000 commands, for example. In some examples, the set of possible voice commands may be all of the commands that are included within menus of a VNUI, or that can be added to one of the menus as described above.

By limiting the set of possible voice commands, the step of identifying a command from a voice utterance may be simplified. There may be less chance of error when the space of possible commands is limited because there may be fewer similar sounding commands. Additionally, there may also be less risk of ambiguity about the intent of an HMD user when the user issues a command. For example, if the user could issue any possible command such as "pizza," the user's intent may not be easily identified. For instance, the user may wish to order a pizza, may wish to run a search engine search for pizza, may wish to find local pizza restaurants, may wish to find pizza recipes, and so on. In some examples, the user may be limited to giving only certain voice commands that are unlikely to create ambiguous intent. For instance, the user may be limited to using the command "order a pizza," in order to unambiguously demonstrate an intent to purchase a pizza. Other possible constructions for defining the scope of possible voice commands exist as well.

At block 1020 of method 1000, the HMD may select a service action corresponding to the first command. As noted, certain commands within the space of commands may require fulfillment by a third party service provider. By issuing a command from the space of commands that indicates a need for a service provider, a user may be communicating a specific intent to receive a certain selected service. In order to fulfill the request, a selected service may be identified.

A framework may be used to select a service action for a given voice command. FIG. 11B shows an example command-service mapping, according to an example embodiment. Each voice command that may require fulfillment by a third party service provider may be mapped to a specific service action. For instance, "order a pizza" 1110 may be mapped to a pizza delivery service action 1150, "call a plumber" 1120 may be mapped to a plumbing service action 1160, "buy a movie ticket" 1130 may be mapped to a ticket selling service action 1170, and so on.

In some example embodiments, a service action may incorporate input from users and/or third parties that is needed to fulfill a service request. For instance, instead of just issuing a command to "order a pizza," a user may be able to issue a command to "order a pepperoni pizza." The type of pizza topping may then be included within the selected service action. Additionally, a user may be able to issue a command to "order a large, pepperoni pizza" so that the size of the pizza may also be included within the selected service action, and so on. In further examples, information needed to fulfill the service request may be included within the selected service action, such as billing information or the delivery address of the HMD user.

At block 1030 of method 1000, after selecting a service action, the HMD can determine a selected service provider for the selected service action. The selected service provider may be selected from a number of different service providers that are each capable of fulfilling the requested service.

Figure 12A:
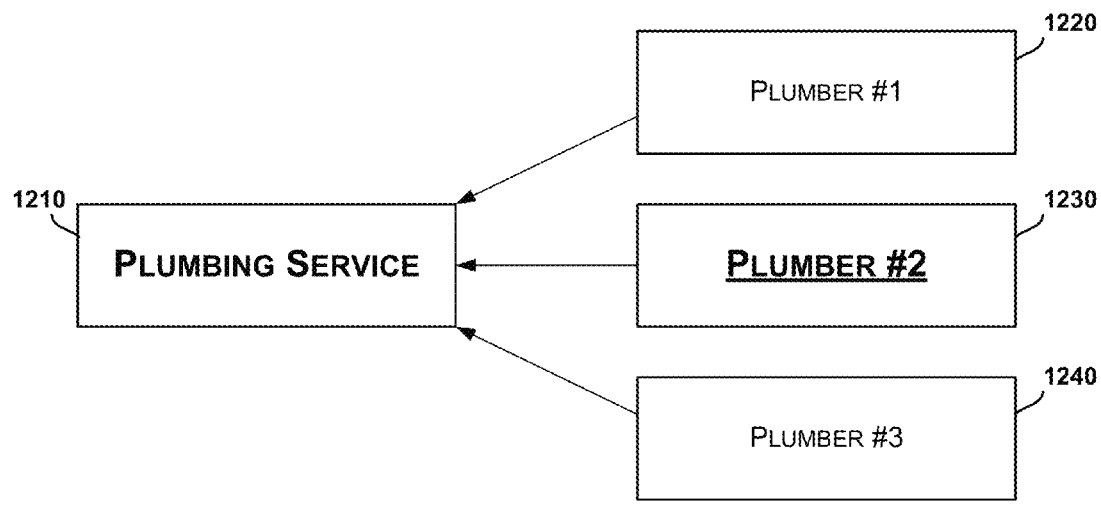
FIG. 12A shows an example determination of a service provider, according to an example embodiment.

FIG. 12A shows an example determination of a selected service provider, according to an example embodiment. As shown, multiple service providers (plumber #1 1220, plumber #2 1230, plumber #3 1240) may be capable of fulfilling the requested plumbing service 1210. Each service provider may indicate in advance which services it is capable and willing to fulfill. A selected service provider may then be chosen to complete the selected service action from those service providers willing to fulfill the selected service. In this case, plumber #2 1230 may be the selected service provider from among the available plumbers.

In some examples, determining the selected service provider may involve the use of an auction. Each service provider may indicate which services it would like to fulfill. Each service provider may then provide a bid for the right to fulfill the requested service. Limiting the set of possible service requests to a predetermined set where each service request corresponds to a voice command with a specific user intent may facilitate the bidding process because only a certain number of possible requests must be considered by the bidders. The service provider with the highest bid may then be chosen as the selected service provider to fulfill the requested service. The data processing for the auction may be carried out on the HMD's or remotely on a cloud-based server system.

In further examples, the auction may be carried out in real time. The service providers may each provide parameters that may be used to determine their bids when a certain service is requested. In some examples, the service providers may first provide a bid price for each service it wishes to fulfill. The bid price may then be modified according to various parameters, such as the location of the HMD user or the time of day. The service providers may also input a budget that indicates the total amount they are willing to bid in a certain period of time. When a service request comes in, bids from a number of different providers may be determined, and a winning service provider may be determined based on the bids. In further examples, bids from different service providers may be periodically refreshed using a timeout period.

In additional examples, the auction results may be predetermined. For instance, a winning service provider may be pre-computed for each possible service request. Accordingly, when a service request is received, a selected service provider may immediately be determined without accessing the network. For instance, a cloud-based server system may pre-compute auction results and send those results to local HMD's. Then, when an HMD receives a service request, it may use the pre-computed auction results to determine the selected service provider. In further examples, the auction results may be periodically updated, for instance, after receiving each service request or after receiving a certain number of service requests.

Other factors may be used in addition to or instead of auctions to determine a selected service provider as well. For example, a preference metric may be determined for each service provider. The preference metric may be based on the total number of service requests fulfilled by each of the service providers in a certain period time, the prices charged by each of the service providers, or the overall satisfaction of users making the requests from each of the service providers, for instance. In another example, the preference metric may also be preset by individual HMD users. A service provider with a higher preference metric may be chosen to fulfill a service over a service provider with a lower preference metric.

In another example, the distance of the HMD from each of the service providers may also be factored into the determination of a selected service provider. For instance, a threshold distance could be set, and only selected service providers closer to the HMD than the threshold distance may be eligible to become the selected service provider. In another example, the distance of each service provider from the HMD may be factored into the determination of a preference metric. Other examples for determining a selected service provider exist as well.

At block 1040 of method 1000, the HMD may send a service fulfillment request to the selected service provider to execute the selected service action. The service fulfillment request may contain enough information such that the third party service provider can fulfill the request. For instance, the request may include the requested service, the location of the HMD user, the mailing address of the intended recipient, price information, timeline for filling the request, and so on.

Figure 12B:
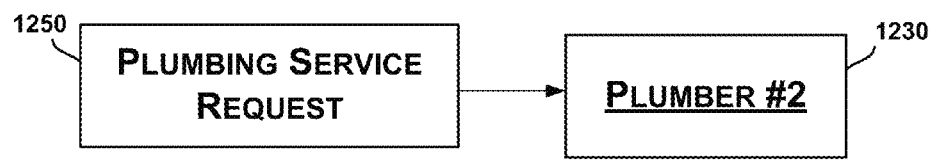
FIG. 12B shows an example service request, according to an example embodiment.

FIG. 12B shows an example service request, according to an example embodiment. After a selected service provider is determined (e.g., plumber #2 1230), a plumbing service request 1250 may be sent to the selected plumber. The request may include information about where the plumbing service is needed, by what day or time the service is needed, what time of day the plumber should come to provide the service, and so on.

In some examples, the HMD user may not see which service provider was selected to fulfill the user's service request. For example, the user may order the device to "purchase widget 18573." A selected service provider may be determined by using an auction and/or one or more of the other methods described above. The widget may then be received at the user's door a few days later. Accordingly, the process may be streamlined to present a better overall user experience.

Figure 13:
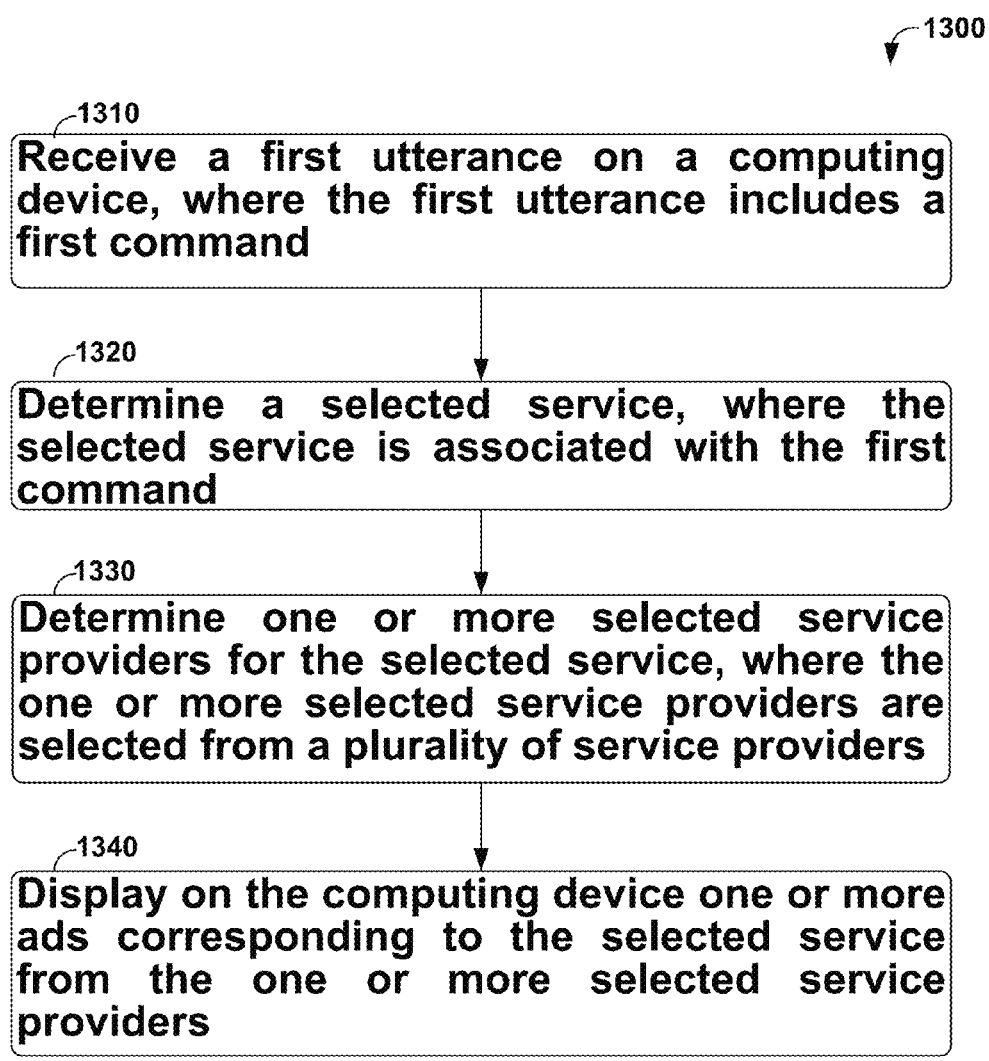
FIG. 13 is a flow chart illustrating another method, according to an example embodiment.

FIG. 13 is a flow chart illustrating a method 1300, according to an example embodiment. In FIG. 13, method 1300 is described by way of example as being carried out by a wearable computer and possibly a wearable computer that includes a head-mounted display (HMD). However, it should be understood that example methods, such as method 1300, may be carried out by a wearable computer without wearing the computer. For example, such methods may be carried out by simply holding the wearable computer using the wearer's hands. Other possibilities may also exist.

Further, example methods, such as method 1300, may be carried out by devices other than a wearable computer, and/or may be carried out by sub-systems in a wearable computer or in other devices. For example, an example method may alternatively be carried out by a device such as a mobile phone or laptop computer. Other examples are also possible. The method 1300 may be carried out by a remote server system as described above as well.

As shown in FIG. 13, method 1300 begins at block 1310, where a computing device such as an HMD may receive a first utterance, which includes a first command. As described above, the first command may be a command that requires fulfillment by a third party service provider. Each command may be accessible to the user, for example by including the commands in one or menus of VNUI. Furthermore, the command may be selected from a predetermined space of possible voice commands that require the assistance of a third party.

At block 1320 of method 1300, the HMD may select a service action associated with the first command. Each command may be associated with a specific service action that the HMD user is indicating a desire to have fulfilled. As described above, a framework, or mapping, may be used to select a service action for a given voice command. Furthermore, the selected service action may incorporate information needed to complete the requested service.

At block 1330 of method 1300, after selecting a service action, the HMD may determine one or more selected service providers for the selected service action. The selected service providers may be selected from a number of different service providers that are each capable of fulfilling the requested service.

Figure 14A:
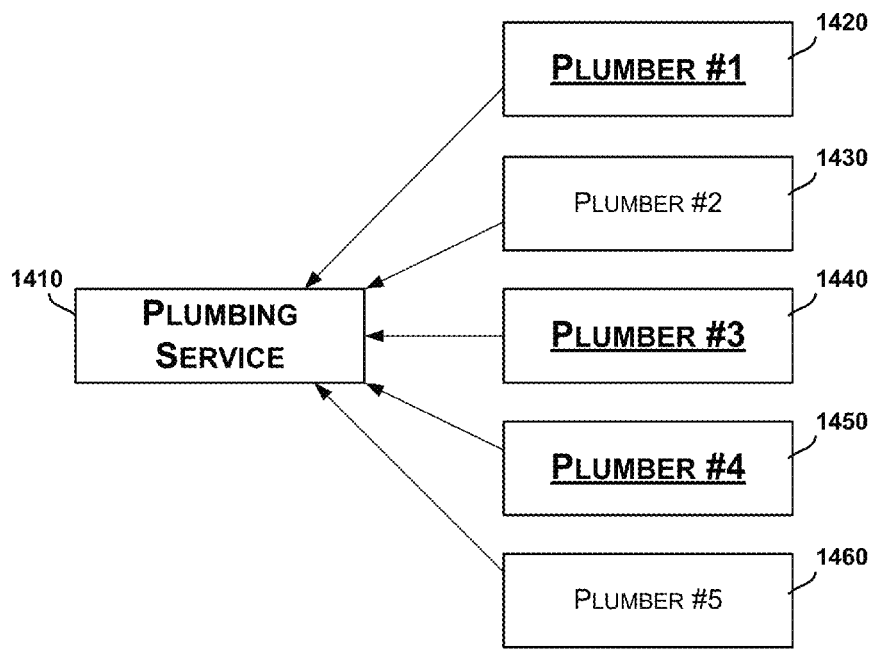
FIG. 14A shows an example determination of multiple service providers, according to an example embodiment.

FIG. 14A shows an example determination of multiple selected service providers, according to an example embodiment. As shown, multiple service providers (plumber #1 1420, plumber #2 1430, plumber #3 1440, plumber #4 1450, and plumber #5 1460) may each be capable of fulfilling the requested plumbing service action 1410. Each service provider may indicate in advance which services it is capable and willing to fulfill. The selected service providers may then be chosen from those service providers willing to fulfill the selected service action.

In this case, plumber #1 1420, plumber #3 1440, and plumber #4 1450 may be the selected service providers from among the available plumbers. Three selected service providers are shown in this example, but any number could be used. Furthermore, a set number of selected service providers could always be chosen or the number of selected service providers could vary depending on various factors such as how many service providers in total are capable and willing to fulfill the requested service.

In some examples, determining the selected service providers may involve the use of an auction. Each service provider may indicate which services it would like to fulfill. Each service provider may then provide a bid for the right to fulfill the requested service. Limiting the set of possible service requests to a predetermined set where each service request corresponds to a voice command with a specific user intent may facilitate the bidding process because only a certain number of possible requests must be considered by the bidders. A certain number of service providers with the highest bids may then be chosen as the selected service providers. The data processing for the auction may be carried out on the HMD's or remotely on a cloud-based server system.

As in method 1000, the auction may be carried out in real time or the auction results may be predetermined. Additionally, other factors may be used in addition to or instead of an auction to determine the selected service providers as well. For example, a preference metric may be determined for each service provider, and may then be used to help determine the selected service providers. Additionally, the distance from the HMD to each of the service providers may also be factored into the determination of the selected service providers. Other factors may be used for determining the selected service providers as well.

At block 1340 of method 1300, after determining the selected service providers, the HMD may display advertisements corresponding to the selected service action from the selected service providers. For instance, if three selected service providers were determined, then a user of the HMD may be presented with an advertisement from each of the three selected service providers to fulfill the service request.

Figure 14B:
FIG. 14B shows an example display showing ads from multiple service providers, according to an example embodiment.

FIG. 14B shows an example display showing ads from multiple service providers, according to an example embodiment. As shown, the three selected service providers (plumber #1, plumber #3, and plumber #4) may each display an advertisement within a view 1470 of a display of the HMD. In some cases, the ads may be created separately by each of the service providers and then transmitted to the HMD to display them. In other cases, a uniform format may be used for each of the ads along with some identifying information from each of the service providers. In additional examples, service providers may be able to provide different advertisements depending on the requested service or on other factors. Other methods of presenting advertisements from the service providers to the user may be used as well.

In some embodiments, method 1400 may further involve the HMD receiving a selected advertisement from the one or more displayed advertisements, and sending a service fulfillment request to the service provider corresponding to the selected advertisement to execute the selected service action. For instance, the HMD user may select which service provider she would like to fulfill her service request by selecting one of the displayed advertisements using a voice command, a physical or virtual button, a head or eye movement, or a different type of user input.

Figure 14C:
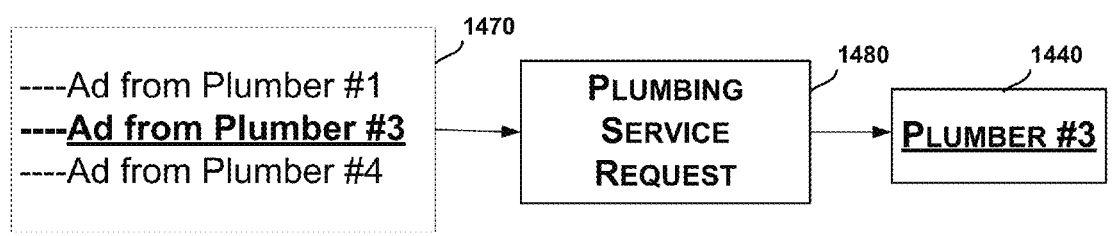
FIG. 14C shows an example service request to a selected service provider, according to an example embodiment.

FIG. 14C shows an example service request to a selected service provider, according to an example embodiment. In this case, the HMD may have received a selection of the advertisement from plumber #3 from the HMD user, as shown in 1470. A plumbing service request 1480 may then be issued to plumber #3 1440. The request may include information about where the plumbing service is needed, by what day or time the service is needed, what time of day the plumber should come to provide the service, and so on.

In some embodiments, method 1400 may additionally include the HMD receiving one or more additional utterances on the computing device, where each of the one or more additional utterances includes the first command. Furthermore, the method 1400 may also include the HMD sending a service fulfillment request to the service provider corresponding to the selected advertisement to execute the selected service action for each of the one or more additional utterances.

Accordingly, a user may only need to select an advertisement from the list of advertisements 1470 the first time the service is requested. Afterwards, when the user requests the same service again, a service request may automatically be sent to the same selected service provider that the user already chose in order to again service the request. The user experience may therefore be improved by not requiring the user to choose a service provider each time she issues the same service request.

In another example, the user may select an advertisement from the list of advertisements 1470 when the first command is first added to a menu, or at some other time before the service is ever requested by the user. Accordingly, the user may be able to pre-program which service provider will handle one or more different service requests before issuing the requests. Then, when the user does issue a service request, a service fulfillment request may immediately be sent to the chosen service provider to handle the request. The user may therefore be able to request services from third parties without any wait time after initially configuring which service providers will handle the requests.

G. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method, comprising:
   providing for display of a voice-navigable user interface (VNUI) on a display interface of a computing device, the VNUI comprising one or more visible menus that include a predetermined set of commands requiring fulfillment by third-party service providers, wherein each command of the predetermined set of commands is mapped to a corresponding service action;
   receiving, for each respective service action, bids from a plurality of third-party service providers for a right to execute the respective service action;
   determining, by the computing device, for each respective service action, a respective third-party service provider that will receive future requests to execute the respective service action based on the received bids for the right to execute the respective service action;
at a first time, caching on the computing device, for each respective service action, the respective third-party service provider that will receive the future requests to execute the respective service action;
at a second time later than the first time, detecting, using a microphone communicatively connected to the computing device, a first utterance at the computing device;
determining that the first utterance corresponds to a chosen command from the predetermined set of commands accessible from the VNUI;
selecting a service action to which the chosen command is mapped;
selecting, by the computing device, from the cached third-party service providers, a service provider for the selected service action, wherein the selected service provider is the respective cached third-party service provider determined to receive the future requests to execute the selected service action; and
sending a service fulfillment request to the selected service provider to execute the selected service action.

2. The method of claim 1, wherein determining the respective third-party service provider that will receive the future requests to execute the respective service action comprises determining a distance between the computing device and the plurality of service providers.

3. The method of claim 1, wherein determining the respective third-party service provider that will receive the future requests to execute the respective service action comprises determining a preference metric for each of the plurality of service providers.

4. The method of claim 1, wherein the computing device is a head-mountable device (HMD).

5. The method of claim 1, wherein the respective third-party service provider that will receive the future requests to execute the respective service action is periodically refreshed.

6. A non-transitory computer readable medium having stored therein instructions executable by a computing device to cause the computing device to perform functions comprising:
providing for display of a voice-navigable user interface (VNUI) on a display interface of the computing device, the VNUI comprising one or more visible menus that include a predetermined set of commands requiring fulfillment by a third-party service providers, wherein each command of the predetermined set of commands is mapped to a corresponding service action;
receiving, for each respective service action, bids from a plurality of third-party service providers for a right to execute the respective service action;
determining, for each respective service action, a respective third-party service provider that will receive future requests to execute the respective service action based on the received bids for the right to execute the respective service action;
at a first time, caching on the computing device, for each respective service action, the respective third-party service provider that will receive the future requests to execute the respective service action;
at a second time later than the first time, detecting, using a microphone communicatively connected to the computing device, a first utterance at the computing device;
determining that the first utterance corresponds to a chosen command from the predetermined set of commands accessible from the VNUI;
selecting a service action to which the chosen command is mapped;
selecting, from the cached third-party service providers, a service provider for the selected service action, wherein the selected service provider is the respective cached third-party service provider determined to receive the future requests to execute the selected service action; and
sending a service fulfillment request to the selected service provider to execute the selected service action.

7. The non-transitory computer readable medium of claim 6, wherein determining the respective third-party service provider that will receive the future requests to execute the respective service action comprises determining a distance between the computing device and the plurality of service providers.

8. The non-transitory computer readable medium of claim 6, wherein determining the respective third-party service provider that will receive the future requests to execute the respective service action comprises determining a preference metric for each of the plurality of service providers.

9. The non-transitory computer readable medium of claim 6, wherein the computing device comprises a wearable computing device.

10. The non-transitory computer readable medium of claim 6, wherein the respective third-party service provider that will receive the future requests to execute the respective service action is refreshed after the service fulfillment request for the selected service action has been sent.

11. A wearable computing device, comprising:
a display interface;
one or more microphones;
one or more processors;
a non-transitory computer-readable memory; and
program instructions stored on the non-transitory computer-readable memory and executable by the one or more processors to perform functions comprising:
displaying, on the display interface, a voice-navigable user interface (VNUI) comprising one or more visible menus that include a predetermined set of commands requiring fulfillment by third-party service providers, wherein each command of the predetermined set of commands is mapped to a corresponding service action;
receiving, for each respective service action, bids from a plurality of third-party service providers for a right to execute the respective service actions;
determining, for each respective service action, a respective third-party service provider that will receive future requests to execute the respective service action based on the received bids for the right to execute the respective service action;
at a first time, caching on the wearable computing device, for each respective service action, the respective third-party service provider that will receive the future requests to execute the respective service action;
at a second time later than the first time, detecting, with the one or more microphones, a first utterance at the wearable computing device;
determining that the first utterance corresponds to a chosen command from the predetermined set of commands accessible from the VNUI;
selecting a service action to which the chosen command is mapped;
selecting, from the cached third-party service providers, a service provider for the selected service action, wherein the selected service provider is the respective cached third-party service provider determined to receive the future requests to execute the selected service action; and sending a service fulfillment request to the selected service provider to execute the selected service action.

12. The wearable computing device of claim 11, wherein determining the respective third-party service provider that will receive the future requests to execute the respective service action comprises determining a distance between the wearable computing device and the plurality of service providers.

13. The wearable computing device of claim 11, wherein determining the respective third-party service provider that will receive the future requests to execute the respective service action comprises determining a preference metric for each of the plurality of service providers.

14. The wearable computing device of claim 11, wherein the respective third-party service provider that will receive the future requests to execute the respective service action is refreshed after the service fulfillment request for the selected service action has been sent.

15. The method of claim 1, wherein determining the respective third-party service provider that will receive the future requests to execute the respective service action based on the received bids for the right to execute the respective service action comprises:

selecting a highest-bidding third-party service provider that provided a highest bid of the bids received from the plurality of third-party service providers.

16. The method of claim 15, wherein caching on the computing device the respective third-party service provider that will receive the future requests to execute the respective service action comprises:

caching on the computing device the highest-bidding third-party service provider.

17. The non-transitory computer readable medium of claim 6, wherein determining the respective third-party service provider that will receive the future requests to execute the respective service action based on the received bids for the right to execute the respective service action comprises:

selecting a highest-bidding third-party service provider that provided a highest bid of the bids received from the plurality of third-party service providers.

18. The non-transitory computer readable medium of claim 17, wherein caching on the computing device the respective third-party service provider that will receive the future requests to execute the respective service action comprises:

caching on the computing device the highest-bidding third-party service provider.

19. The wearable computing device claim 11, wherein determining the respective third-party service provider that will receive the future requests to execute the respective service action based on the received bids for the right to execute the respective service action comprises:

selecting a highest-bidding third-party service provider that provided a highest bid of the bids received from the plurality of third-party service providers.

20. The wearable computing device of claim 19, wherein caching on the computing device the respective third-party service provider that will receive the future requests to execute the respective service action comprises:

caching on the wearable computing device the highest-bidding third-party service provider.

* * * * *